(12) United States Patent
Nakagawa et al.

(10) Patent No.: US 10,072,137 B2
(45) Date of Patent: Sep. 11, 2018

(54) POLYAMIDE RESIN COMPOSITION HAVING HIGH MELT POINT AND BEING EXCELLENT IN ANTI-VIBRATION PROPERTY UPON WATER ABSORPTION

(71) Applicant: TOYOBO CO., LTD., Osaka (JP)

(72) Inventors: Tomohide Nakagawa, Shiga (JP); Tatsuya Oi, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 341 days.

(21) Appl. No.: 14/896,751

(22) PCT Filed: Jun. 23, 2014

(86) PCT No.: PCT/JP2014/066507
§ 371 (c)(1),
(2) Date: Dec. 8, 2015

(87) PCT Pub. No.: WO2015/001996
PCT Pub. Date: Jan. 8, 2015

(65) Prior Publication Data
US 2016/0130424 A1 May 12, 2016

(30) Foreign Application Priority Data

Jul. 4, 2013 (JP) .................. 2013-140941

(51) Int. Cl.
C08K 7/14 (2006.01)
C08K 3/16 (2006.01)
(Continued)

(52) U.S. Cl.
CPC ................ C08K 7/14 (2013.01); C08G 69/36 (2013.01); C08J 5/043 (2013.01); C08K 3/16 (2013.01);
(Continued)

(58) Field of Classification Search
CPC ..................................... C08K 7/14; C08K 3/16
See application file for complete search history.

(56) References Cited

FOREIGN PATENT DOCUMENTS

| JP | 3-88846 | 4/1991 |
|---|---|---|
| JP | 7-118522 | 5/1995 |

(Continued)

OTHER PUBLICATIONS

International Preliminary Report on Patentability dated Jan. 14, 2016 in International Application No. PCT/JP2014/066507.
(Continued)

Primary Examiner — Ling Siu Choi
Assistant Examiner — Thuy-Ai N Nguyen
(74) Attorney, Agent, or Firm — Wenderoth, Lind & Ponack, L.L.P.

(57) ABSTRACT

The present invention provides a polyamide resin composition having high melt point which can produce a molded product having high anti-vibration property or, in other words, having very high resonance frequency and, in particular, being capable of retaining high resonance frequency even upon water absorption. A polyamide resin composition, comprising a polyamide resin (A) having melt point (Tm) of 290° C. to 350° C. and having crystallization temperature upon temperature rise (Tc1) of 80 to 150° C., and glass fibers (B) having cross-sectional area of 1.5 to $5.0 \times 10^{-6}$ cm$^2$, characterized in that, ratio by weight of the polyamide resin (A) to the glass fibers (B) [(A):(B)] is from 20:80 to 35:65, and that the polyamide resin (A) is a copolymerized polyamide consisting of 55 to 75 molar % of a constituent unit (a) obtained from an equimolar salt of hexamethylenediamine and terephthalic acid, and 45 to 25 molar % of a constituent unit (b) obtained from 11-aminoundecanoic acid or undecane lactam.

9 Claims, 2 Drawing Sheets

(51) Int. Cl.
*C08G 69/36* (2006.01)
*C08J 5/04* (2006.01)
*C08L 77/02* (2006.01)
*C08L 77/06* (2006.01)

(52) U.S. Cl.
CPC ............... *C08L 77/02* (2013.01); *C08L 77/06* (2013.01); *C08J 2377/06* (2013.01)

(56) References Cited

FOREIGN PATENT DOCUMENTS

| | | |
|---|---|---|
| JP | 11-286606 | 10/1999 |
| JP | 3474246 | 9/2003 |
| JP | 2005-162775 | 6/2005 |
| JP | 2008-95066 | 4/2008 |
| JP | 2009-40808 | 2/2009 |
| JP | 2012-132027 | 7/2012 |
| JP | 2012-136620 | 7/2012 |
| JP | 2012-153798 | 8/2012 |
| JP | 2014-152322 | 8/2014 |
| WO | 2009/031521 | 3/2009 |
| WO | 2012/161064 | 11/2012 |

OTHER PUBLICATIONS

International Search Report dated Sep. 16, 2014, in International (PCT) Application No. PCT/JP2014/066507.

[Fig. 1]
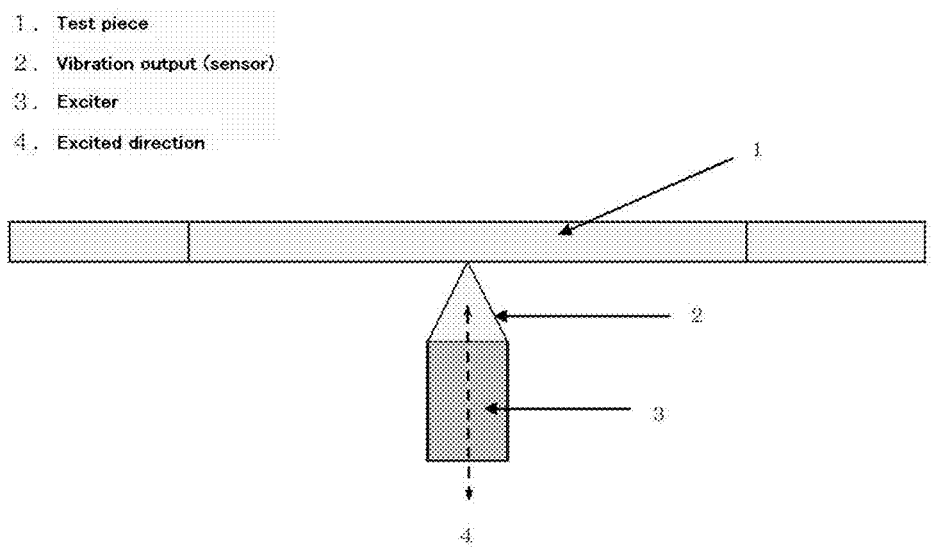

[Fig. 2]
(a)
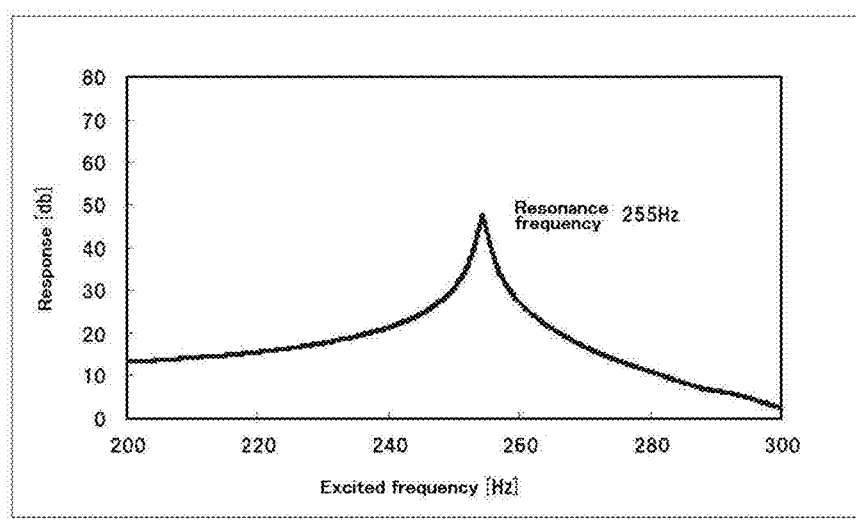
(b)
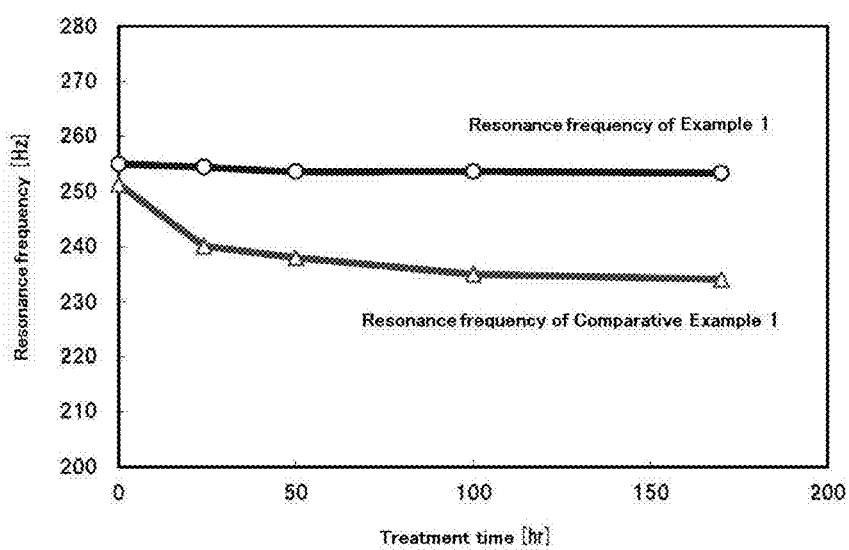

POLYAMIDE RESIN COMPOSITION HAVING HIGH MELT POINT AND BEING EXCELLENT IN ANTI-VIBRATION PROPERTY UPON WATER ABSORPTION

TECHNICAL FIELD OF THE INVENTION

The present invention relates to a polyamide resin composition in which glass fibers having a specific cross-sectional area are added to a specific polyamide resin having high melt point and low water absorption rate whereby very high resonance frequency is achieved. More particularly, it relates to a polyamide resin composition wherein, due to its very low water absorption rate, anti-vibration property does not lower even when a molded product thereof absorbs water. The polyamide resin composition according to the present invention can be advantageously used as a molded product such as a case for electric/electronic parts and parts for vehicles used for interior and exterior equipments for automobiles.

BACKGROUND ART

Polyamide resin can express not only high strength and high rigidity but also high deflectability under loading when it is reinforced with glass fiber. Therefore, a polyamide resin composition reinforced with glass fiber is widely used as interior and exterior equipments in the fields of electric/electronic devices and automobiles. In recent years, required level of anti-vibration property is becoming high due to a demand for making thickness of the product thin particularly in the field of electric/electronic devices and due to a demand for making size of the vehicle part small. Accordingly, there has been a demand for a thermoplastic resin composition having high specific elastic modulus expressed by (elastic modulus)/(specific gravity). A polyamide resin composition generally has high water absorption rate and results in lowering of elastic modulus when it absorbs water. Accordingly, there is a disadvantage that a polyamide resin composition reinforced with glass fiber based on a polyamide 6 or polyamide 66 ingredient lowers its anti-vibration property upon water absorption. Moreover, the rate of the resin becomes low when the filling amount of glass fiber is 60% by weight or more. Accordingly, a lowering rate of strength, elastic modulus, etc. to the absolute amount of absorbed water becomes much more whereby the use as electric/electronic part cases and interior equipment and exterior equipment parts for vehicles is limited.

Further, particularly in mounting of electric/electronic parts in recent years, surface mounting system (flow system and reflow system) has been quickly spread due to miniaturization of parts as a result of miniaturization of the product size, densification of mounting, simplification of steps and reduction in costs. In the surface mounting system, since the environmental temperature during the steps becomes the melt point of solder or higher (240 to 260° C.), the resin used therefor is also inevitably demanded for heat resistance at the above environmental temperature. Moreover, in the surface mounting step, swelling and deformation of the mounted parts caused by water absorption of the resin may become a problem. Accordingly, low water absorption property is demanded for the resin used. As to the resin which satisfies such a property, 6T nylon and 9T nylon have been known and there is mentioned, for example, in Patent Documents 1 and 2 that those aromatic polyamides can be used for electric/electronic parts of a surface mounting type.

In the Patent Document 3, Nylon 66 base is copolymerized with isophthalamide component which lowers the crystallinity followed by compounding with 60% or more of a reinforcing material such as glass fiber to give a resin composition having an anti-vibration property with high resonance frequency. However, an increase in elastic modulus is not sufficient due to the component which lowers the crystallinity, and no good balance between bending elastic modulus and specific gravity for giving the resonance frequency of 200 Hz or more is achieved in a test sample shape. There is also another fear of deterioration of elongation and impact resistance as a result of addition of mica. In addition, since this resin composition results in a significant decrease in elastic modulus due to water absorption, there is a problem that resonance frequency greatly lowers in its actual use.

In Patent Document 4, there is disclosed a long-fiber polyamide molding material in which polyamide resin is combined with glass roving fibers having a non-circular cross section. However, in Examples of this patent document, glass fibers are not compounded in an amount of 60% or more. Therefore, the ratio of (elastic modulus)/(specific gravity) which is in a proportional relation with resonance frequency is not sufficiently high. As a result, although it is a molding material having high level properties in terms of strength and impact resistance, no sufficient property is expressed so far as anti-vibration property is concerned. In addition, the polyamide disclosed in the Patent Document 4 also has high water absorption rate. Accordingly, the resin molding material results in a significant decrease in elastic modulus due to water absorption. As a result, there is a problem that resonance frequency greatly lowers in its actual use.

In Patent Document 5, plural resins such as polyamide 6, polyamide 66 and non-crystalline polyamide are used not by means of copolymerization but by means of a blended base, then a reinforcing material is highly filled while the crystallinity is still kept and, further, polypropylene is added thereto in an optimum amount whereupon high resonance frequency is achieved and, at the same time, attenuation property is also imparted. However, as to the current demand for the anti-vibration, resonance frequency of 230 Hz or more is required in the test method of Patent Document 5. When a resin expressing low elastic modulus such as polypropylene is used as a component, it is absolutely impossible to satisfy the requirement. Accordingly, there has been a demand for a combination of glass fibers with thermoplastic resin which can express higher specific elastic modulus. In addition, the polyamide disclosed in the Patent Document 5 also has high water absorption rate. Accordingly, the resin composition results in a significant decrease in elastic modulus due to water absorption, there is a problem that resonance frequency greatly lowers in its actual use.

PRIOR ART DOCUMENTS

Patent Documents

Patent Document 1: Japanese Patent Application Laid-Open (JP-A) No. 88846/91
Patent Document 2: Japanese Patent No. 3474246 Patent Document 3: Japanese Patent Application Laid-Open (JP-A) No. 118522/95
Patent Document 4: Japanese Patent Application Laid-Open (JP-A) No. 2008-95066

Patent Document 5: Japanese Patent Application Laid-Open (JP-A) No. 2005-162775

DISCLOSURE OF THE INVENTION

Problem that the Invention is to Solve

The present invention has been created in view of the current status of the above-mentioned prior art and its object is to provide a polyamide resin composition having high melt point which can produce a molded product having high anti-vibration property or, in other words, having very high resonance frequency and, in particular, being capable of retaining high resonance frequency even upon water absorption.

Means for Solving the Problem

The present inventors have eagerly investigated for achieving such an object and, as a result, they have found that, when glass fibers having a cross section of specific shape are added to a specific polyamide resin having high melt point and glass transition temperature, expression of elastic modulus becomes to be maximum to the specific gravity thereof, and such property can be retained even upon water absorption. Addition of glass fibers to a polyamide resin having high melt point and glass transition temperature is difficult in view of the processing temperature as compared with the addition of glass fibers to polyamide 6 and polyamide 66 having melt point of 270° C. or lower. The present inventors have found that, when cross-sectional area of glass fibers is made different from that of the commonly used glass fibers, fiber numbers and glass fiber surface area are reduced as compared with the case wherein the commonly used glass fibers having cross-sectional area of $9.5 \times 10^{-7}$ cm$^2$ (glass fiber diameter: 11 μm) or the commonly used glass fibers having cross-sectional area of $13.3 \times 10^{-6}$ cm$^2$ (glass fiber diameter: 13 μm) is used and that, in spite of a high filling amount of glass, production by a biaxial extruder is easy even for polyamide having high melt point. To be more specific, when the polyamide resin composition as such is used, a molded product having satisfactory bending property can be prepared and accordingly the product not only has high resonance frequency which could not be achieved in the prior art but also has excellent strength and impact resistance without lowering the anti-vibration property upon water absorption. As a result, the present invention has been accomplished.

Thus, the present invention adopts the following constitutions (1) to (9).

(1) A polyamide resin composition, comprising a polyamide resin (A) having melt point (Tm) of 290° C. to 350° C. and having crystallization temperature upon temperature rise (Tc1) of 80 to 150° C., and glass fibers (B) having cross-sectional area of 1.5 to $5.0 \times 10^{-6}$ cm$^2$, characterized in that, ratio by weight of the polyamide resin (A) to the glass fibers (B) [(A):(B)] is from 20:80 to 35:65, and that the polyamide resin (A) is a copolymerized polyamide consisting of 55 to 75 molar % of a constituent unit (a) obtained from an equimolar salt of hexamethylenediamine and terephthalic acid, and 45 to 25 molar % of a constituent unit (b) obtained from 11-aminoundecanoic acid or undecane lactam.

(2) The polyamide resin composition according to (1), wherein the polyamide resin (A) contains at most 20 molar % of a constituent unit (c) obtained from an equimolar salt of diamine and dicarboxylic acid which is other than the above constituent unit (a) or a constituent unit (c) obtained from aminocarboxylic acid or lactam which is other than the above constituent unit (b).

(3) The polyamide resin composition according to (1) or (2), wherein a part of or all of the glass fibers (B) is/are glass fibers having a flat cross section, wherein the glass fibers having a flat cross section consist of glass fibers (B-1) having a flat cross section and having ratio of short diameter to long diameter of from 0.3 to 0.5 and glass fibers (B-2) having a flat cross section and having ratio of short diameter to long diameter of from 0.2 to 0.3, and wherein ratio by weight thereof [(B-1):(B-2)] is from 0:100 to 100:0.

(4) The polyamide resin composition according to any of (1) to (3), wherein the composition further comprises a copper compound (C) in an amount of at most 0.5% by weight.

(5) The polyamide resin composition according to any of (1) to (4), wherein the composition further comprises an additive component (D) containing mold-releasing agent, stabilizer, carbon black, and/or coupling agent in an amount of at most 5% by weight.

(6) A molded product formed of the polyamide resin composition according to any of (1) to (5), wherein specific gravity ρ (g/cm$^3$) of the molded product and bending elastic modulus E (GPa) of the molded product satisfy formulae: $11 < E/\rho < 18$ and $1.7 < \rho < 2.0$.

(7) The molded product according to (6), wherein weight-average length of the residual glass fibers in the molded product is 300 to 1000 μm.

(8) The molded product according to (6) or (7), wherein the molded product is used for electric/electronic cases or for interior equipment or exterior equipment of vehicles.

(9) The molded product according to (8), wherein the molded product is used for parts for holding a mirror for vehicles.

Advantages of the Invention

In the polyamide resin composition according to the present invention, cross-sectional area of the glass fibers to be added thereto is stipulated to a specific range whereby expression of elastic modulus to specific gravity can be controlled in an area wherein the glass fibers are highly filled. Moreover, water absorption rate and lowering of resonance frequency of the glass fiber can be made low and quite small, respectively by means of addition of the glass fibers to a specific polyamide resin having high melt point and high glass transition temperature. As a result, the polyamide resin composition according to the present invention can afford high resonance frequency. Also, it has high strength and impact resistance. Further, it does not exhibit lowering of resonance frequency due to water absorption. Accordingly, it is very useful as cases of electric/electronic instruments and as parts used for interior and exterior equipments for automobiles.

BRIEF DESCRIPTION OF THE DRAWINGS

FIG. 1 is a brief drawing of a vibration test apparatus for evaluating resonance frequency.

FIG. 2(a) is a result of measurement of resonance frequency of Example 1.

FIG. 2(b) is a graph of resonance frequency with elapse of time of Example 1 and Comparative Example 1 after the treatment at 80° C.×95%.

BEST MODE FOR CARRYING OUT THE INVENTION

The polyamide resin composition according to the present invention comprises a specific polyamide resin (A) having high melt point, and glass fibers (B) having cross-sectional area of 1.5 to $5.0 \times 10^{-6}$ cm$^2$. In the polyamide resin composition according to the present invention, the above (A) and (B) are the main constituents. It is preferred that their total amount occupies 95% by weight or more.

The polyamide resin (A) used in the present invention is characterized in that it has melt point (Tm) of 290° C. to 350° C. and crystallization temperature upon temperature rise (Tc1) of 80 to 150° C. Specifically, such polyamide resin (A) is a copolymerized polyamide consisting of 55 to 75 molar % of a constituent unit (a) obtained from an equimolar salt of hexamethylenediamine and terephthalic acid, and 45 to 25 molar % of a constituent unit (b) obtained from 11-aminoundecanoic acid or undecane lactam.

The polyamide resin (A) is compounded for achieving excellent molding property in addition to high heat resistance, fluidity and low water absorption property. The polyamide resin (A) contains the component (a) corresponding to polyamide 6T and the component (b) corresponding to polyamide 11 in a specific ratio, and has such a characteristic feature that the high water absorption property which is the disadvantage in the conventional 6T nylon (such as polyamide 6T6I consisting of terephthalic acid/isophthalic acid/hexamethylenediamine, polyamide 6T66 consisting of terephthalic acid/adipic acid/terephthalic acid, polyamide 6T6I66 consisting of terephthalic acid/isophthalic acid/adipic acid/hexamethylenediamine, polyamide 6T/M-5T consisting of terephthalic acid/hexamethylenediamine/2-methyl-1,5-pentamethylenediamine and polyamide 6T6 consisting of terephthalic acid/hexamethylenediamine/ε-caprolactam) is greatly improved. Moreover, the polyamide (A) has a characteristic feature that fluidity is apt to be secured because of the presence of a flexible long-chain fat skeleton derived from the polyamide 11 component.

The component (a) corresponds to 6T nylon produced by a condensation copolymerization of hexamethylenediamine (6) with terephthalic acid (T) and, to be more specific, it is represented by the following formula (I).

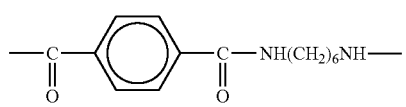

(I)

The component (a) is a main component of the polyamide resin (A) having high melt point and has a role of giving excellent heat resistance, mechanical characteristic, slidability, etc. to the polyamide resin (A) having high melt point. Compounding rate of the component (a) in the copolymerized polyamide (A) is 55 to 75 molar %, preferably 60 to 70 molar %, and more preferably 62 to 68 molar %. When the compounding rate of the component (a) is less than the above lower limit, 6T nylon which is a crystalline component is inhibited in its crystallization by the copolymerizing component and there is a risk of causing the lowering of molding ability and high-temperature characteristics. When it is more than the above upper limit, melt point becomes too high and there is a risk of decomposition upon the processing.

The component (b) corresponds to 11 nylon produced by a polycondensation of 11-aminoundecanoic acid or undecanelactam and, to be more specific, it is represented by the following formula (II).

(II)

The component (b) is used for improving the water absorption property and fluidity which are disadvantages of the component (a). The component (b) has a role of adjusting melt point and crystallization temperature upon temperature rise of the polyamide (A) so as to enhance the molding ability; a role of reducing water absorption rate so as to decrease the trouble caused by changes in the physical property and by changes in the size upon water absorption; and a role of introducing a flexible skeleton so as to improve the fluidity upon melting. Compounding rate of the component (b) in the polyamide resin (A) is 45 to 25 molar %, preferably 40 to 30 molar %, and more preferably 38 to 32 molar %. When the compounding rate of the component (b) is less than the above lower limit, melt point of the polyamide resin (A) does not lower sufficiently whereby there is a risk of insufficient molding property and, at the same time, an effect of reducing the water absorption rate of the resulting resin is insufficient whereby there is a risk of resulting in instability of the physical properties such as lowering of mechanical characteristics upon water absorption. When it is more than the above upper limit, melt point of the polyamide resin (A) lowers too much and crystallization speed become slow whereby there is a risk that the molding property becomes bad and, at the same time, amount of the component (a) corresponding to 6T nylon becomes small whereby there is a risk that mechanical characteristics and heat resistance become insufficient.

Besides the above components (a) and (b), the polyamide resin (A) may be copolymerized, to an extent of at most 20 molar %, with a constituent unit (c) obtained from an equimolar salt of diamine and dicarboxylic acid which is other than the above constituent unit (a) or a constituent unit (c) obtained from aminocarboxylic acid or lactam which is other than the above constituent unit (b). The component (c) has such a role of giving, to the polyamide resin (A), other characteristics which cannot be achieved by 6T nylon or 11 nylon or such a role of further improving the characteristics which are achieved by 6T nylon or 11 nylon. To be more specific, the following copolymerizing components may be listed. Thus, examples of the diamine components are aliphatic diamine such as 1,2-ethylenediamine, 1,3-trimethylenediamine, 1,4-tetramethylenediamine, 5-pentamethylenediamine, 2-methyl-1,5-pentamethylenediamine, 1,6-hexamethylenediamine, 1,7-heptamethylenediamine, 1,8-octamethylenediamine, 1,9-nonamethylenediamine, 2-methyl-1,8-octamethylenediamine, 1,10-decamethylenediamine, 1,11-undecamethylenediamine, 1,12-dodecamethylenediamine, 1,13-tridecamethylenediamine, 1,16-hexadecamethylenediamine, 1,18-octadecamethylene-diamine or 2,2,4(or 2,4,4)-trimethylhexamethylenediamine; alicyclic diamine such as piperazine, cyclohexanediamine, bis(3-methyl-4-aminohexyl)methane, bis(4,4'-amino-cyclohexyl)methane or isophoronediamine; aromatic diamine such as m-xylylenediamine, p-xylylenediamine, p-phenylenediamine or m-phenylenediamine; and hydrogenated products thereof. As to the dicarboxylic acid component, there may be used the dicarboxylic acid or acid anhydride mentioned below. Thus, examples of the dicarboxylic acid are aromatic dicarboxylic acid such as terephthalic acid, isophthalic acid, orthophthalic acid, 1,5-naphthalenedicarboxylic acid, 2,6-naphthalenedicarboxylic acid, 4,4'-diphenyldicarboxylic acid, 2,2'-diphenyldicarboxylic acid, 4,4'-diphenyl ether dicarboxylic acid, 5-(sodium sulfonate)-isophthalic acid or 5-hydroxyisophthalic acid; and aliphatic or alicyclic dicarboxylic acid such as fumaric acid, maleic acid, succinic acid, itaconic acid, adipic acid, azelaic acid, sebacic acid, 1,11-undecanedicarboxylic acid, 1,12-dodecanedicarboxylic acid, 1,14-tetradecanedicarboxylic acid, 1,18-octadecanedicarboxylic acid, 1,4-cyclohexanedicarboxylic acid, 1,3-cyclohexanedicarboxylic acid, 1,2-cyclohexanedicarboxylic acid, 4-methyl-1,2-cyclohexanedicarboxylic acid or dimer acid. Other examples are lactam such as ε-caprolactam or 12-lauryllactam as well as aminocarboxylic acid having a structure wherein the ring of the above is opened.

Examples of the specific component (c) are polycaproamide (polyamide 6), polydodecaneamide (polyamide 12), polytetra-methylene adipamide (polyamide 46), polyhexamethylene adipamide (polyamide 66), polyundecamethylene adipamide (polyamide 116), poly-m-xylylene adipamide (polyamide MXD6), poly-p-xylylene adipamide (polyamide PXD6), polytetramethylene sebacamide (polyamide 410), polyhexa-methylene sebacamide (polyamide 610), polydecamethylene adipamide (polyamide 106), polydecamethylene sebacamide (polyamide 1010), polyhexamethylene dodecamide (polyamide 612), polydecamethylene dodecamide (polyamide 1012), polyhexamethylene isophthalamide (polyamide 6I), polytetramethylene terephthalamide (polyamide 4T), polypentamethylene terephthlamide (polyamide 5T), poly-2-methylpentamethylene terephthalamide (polyamide M-5T), polyhexamethylene hexahydroterephthalamide (polyamide 6T(H)), polynonamethylene terephthalamide (polyamide 9T), polydecamethylene terephthalamide (polyamide 10T), polyundecamethylene terephthalamide (polyamide 11T), polydodecamethylene terephthalamide (polyamide 12T), polybis-(3-methyl-4-aminohexyl)methane terephthalamide (polyamide PACMT), polybis(3-methyl-4-aminohexyl)methane isophthalamide (polyamide PACMI), polybis(3-methyl-4-aminohexyl)methane dodecamide (polyamide PACM 12) and polybis(3-methyl-4-amino-hexyl)methane tetradecamide (polyamide PACM 14). Each of the components may be solely used or plural components may be jointly used for the copolymerization. It is also possible to use any of copolymerization methods such as random copolymerization, block copolymerization and graft copolymerization.

Examples of the preferred component (c) among the above-mentioned constituent units are polyhexamethylene adipamide for giving high crystallinity to the polyamide resin (A) and polydecamethylene terephthalamide, polydodecaneamide, etc. for giving lower water absorption property to the polyamide resin (A). Compounding rate of the component (c) in the polyamide resin (A) is preferred to be at most 20 molar % and more preferred to be 10 to 20 molar %. When the rate of the component (c) is small, there is a risk that the effect by the component (c) may not be well achieved. When it is more than the above upper limit, amounts of the components (a) and (b) which are essential components become small whereby there is a risk that the effect which is inherently intended for the polyamide resin (A) may not be fully achieved.

As to the catalyst used for the production of the polyamide resin (A), examples thereof are phosphoric acid, phosphorous acid, hypophosphorous acid and metal salt, ammonium salt and ester thereof. As to metal species of the metal salt, specific examples thereof are potassium, sodium, magnesium, vanadium, calcium, zinc, cobalt, manganese, tin, tungsten, germanium, titanium and antimony. As to the ester, there may be added ethyl ester, isopropyl ester, butyl ester, hexyl ester, isodecyl ester, octadecyl ester, decyl ester, stearyl ester, phenyl ester, etc. In view of enhancement of melt retention stability, it is preferred to add an alkali compound such as sodium hydroxide, potassium hydroxide or magnesium hydroxide.

Relative viscosity (RV) of the polyamide resin (A) measured at 20° C. in 96% concentrated sulfuric acid is 0.4 to 4.0, preferably 1.0 to 3.0, and more preferably 1.5 to 2.5. As a method for making the relative viscosity of the polyamide into a predetermined range, a means for adjusting molecular weight may be exemplified.

With regard to the polyamide resin (A), terminal group amount and molecular weight of the polyamide can be adjusted by a method wherein polycondensation is conducted by adjusting molar ratio of amino group to carboxyl group or by a method wherein a terminal blocking agent is added. When polycondensation is conducted in a predetermined rate of the molar ratio of amino group to carboxyl group, it is preferred that the molar ratio of the total diamine to the total dicarboxylic acid used therefor is adjusted within such a range wherein (diamine)/(dicarboxylic acid) is from 1.00/1.05 to 1.10/1.00.

As to the timing for adding the terminal blocking agent is to be added, the stage upon charging the materials, upon starting the polymerization, during the latter period of the polymerization or upon finishing the polymerization may be exemplified. As to the terminal blocking agent, although there is no particular limitation so far as it is a monofunctional compound having reactivity with amino group or carboxyl group in the terminal of the polyamide, there may be used monocarboxylic acid or monoamine, acid anhydride such as phthalic anhydride, monoisocyanate, monocarboxylic acid halide, monoester or monohydric alcohol. As to the terminal blocking agent, there may be exemplified aliphatic monocarboxylic acid such as acetic acid, propionic acid, butyric acid, valeric acid, caproic acid, caprylic acid, lauric acid, tridecanoic acid, myristic acid, palmitic acid, stearic acid, pivalic acid or isobutyric acid; alicyclic monocarboxylic acid such as cyclohexanecarboxylic acid; aromatic monocarboxylic acid such as benzoic acid, toluic acid, α-naphthalenecarboxylic acid, β-naphthalenecarboxylic acid, methylnaphthalenecarboxylic acid or phenylacetic acid; acid anhydride such as maleic anhydride, phthalic anhydride or hexahydrophthalic anhydride; aliphatic monoamine such as methylamine, ethylamine, propylamine, butylamine, hexylamine, octylamine, decylamine, stearylamine, dimethylamine, diethylamine, dipropylamine or dibutylamine; alicyclic monoamine such as cyclohexylamine or dicyclohexylamine; and aromatic monoamine such as aniline, toluidine, diphenylamine or naphthylamine.

As to acid value and amine value of the polyamide resin (A), they are preferred to be 0 to 200 eq/ton and 0 to 100 eq/ton, respectively. When the terminal functional group exceeds 200 eq/ton, the outcome is that not only gelling and deterioration are promoted upon melt retention but also the problems such as coloration and hydrolysis may be induced even under a use environment. Incidentally, when glass fiber and reactive compound such as polyolefin which is modified with maleic acid are compounded, it is preferred to make the acid value and/or the amine value within 5 to 100 eq/ton depending upon the reactivity and the reactive group.

The polyamide (A) may be produced by a conventionally known method. For example, it can be easily synthesized by means of a condensation polymerization reaction using hexamethylenediamine and terephthalic acid which are material monomers of the component (a), 11-aminoundecanoic acid or undecane lactam which is a material monomer of the component (b) and, if necessary, a constituent unit (c) obtained from an equimolar salt of diamine and dicarboxylic acid which is other than the above constituent unit (a) or a constituent unit (c) obtained from aminocarboxylic acid or lactam which is other than the above constituent unit (b). There is no particular limitation for the order in the condensation polymerization reaction. All material monomers may be made to react at a time or a part of material monomers may be firstly made to react and then the residual material monomers may be made to react. There is no particular limitation for the polymerization method. The steps from charging the material until producing the polymer may be continuously carried out. Alternatively, it is also possible to use such a method wherein an oligomer is once produced and then polymerization is conducted in another step using an extruder or the like, or the oligomer is made into a high-molecular one by means of solid phase polymerization. When the charging ratio of the starting monomers is adjusted, the rate of each constituent unit in the synthesized copolymerized polyamide may be controlled.

In the polyamide resin composition according to the present invention, it is necessary that the ratio by weight of the polyamide resin (A) to the glass fibers (B) [(A):(B)] is from 20:80 to 35:65. As a result thereof, in the molded product formed of the polyamide resin composition according to the present invention, its specific gravity $\rho$ (g/cm$^3$) and bending elastic modulus E (GPa) can satisfy formulae: $11<E/\rho<18$ and $1.7<\rho<2.0$. When the ratio by weight of the glass fibers (B) is lower than the above range, the above value of E/$\rho$ may become less than 1.7 whereby sufficiently high resonance frequency cannot be achieved. When the ratio by weight of the glass fibers (B) is higher than the above range, the ratio of the glass fibers (B) becomes too high whereby efficient production of the molded product is not possible and, moreover, defect is resulted in the interface between the glass fibers (B) and the polyamide resin whereby sufficient strength and impact resistance cannot be achieved.

It is preferred to use glass fibers having a flat cross section in a part of (for example, 50% by weight or more of) or all of the glass fibers (B). A glass fiber having a flat cross section includes a one wherein cross section being vertical to the lengthwise direction of the fiber is nearly elliptic, nearly long circular or nearly cocoon shape, and flatness degree thereof is preferably 1.5 to 8 and more preferably 2 to 5. Here, the term "flatness degree" is ratio of long diameter to short diameter when a rectangle with the smallest area contacting outside of the cross section vertical to the lengthwise direction of the glass fiber is supposed and length of long side of this rectangle is named the long diameter and length of short side thereof is named the short diameter. When the flatness degree is less than the above range, there is no big difference in terms of the shape from the glass fiber having a circular cross section and, therefore, there are some cases wherein impact resistance of the molding product is not so much enhanced. On the other hand, when the flatness degree is more than the above range, bulk density in the polyamide resin is high and, therefore, there are some cases wherein uniform dispersing in the polyamide is not achieved and there are also some cases wherein impact resistance of the molded product is not so much enhanced. In the present invention, the glass fiber having a nearly long circular cross section whose flatness degree is 2 to 5 is particularly preferred since it expresses high mechanical property. In the present invention, it is necessary that the glass fibers (B) are limited to those having thickness range of 1.5 to $5.0 \times 10^{-6}$ cm$^2$ in terms of the cross-sectional area regardless of shape of the cross section. A glass fiber which has been commonly used up to now having a round cross section of 11 μm or 13 μm diameter is not preferred since properties cannot be efficiently expressed in a highly filled region of 65% by weight or more. When glass fibers having a flat cross section are used in a part of or in all of the glass fibers, it is preferable to use glass fibers (B-1) having a flat cross section and having ratio of short diameter to long diameter of from 0.3 to 0.5 and glass fibers (B-2) having a flat cross section and having said ratio of from 0.2 to 0.3 together in ratio of (B-1) to (B-2) from 0:100 to 100:0, more preferably from 10:90 to 90:10. As a result, it is possible to control warpage, shrinkage and value of (bending elastic modulus):(specific gravity) of the molded product and it is also possible that carbon black or stabilizer which is an additive necessary for improving the weather resistance is sufficiently added.

When the glass fibers (B) are added to the polyamide resin (A) in the present invention, it is important to prepare pellets of a polyamide resin composition which express higher bending elastic modulus to specific gravity, and in particular, which does not exhibit lowering of elastic modulus upon water absorption. For such a purpose, it is necessary to use glass fibers having small glass fiber numbers and having cross-sectional area within a specific range wherein interference among the glass fibers is small. In that case, the cross-sectional area of the glass fibers (B) necessary therefor is 1.5 to $5.0 \times 10^{-6}$ cm$^2$. When the cross-sectional area of the glass fibers is less than that range, not only the fiber numbers per unit weight becomes large but also each single fiber is apt to be bent whereby it is not possible to prepare pellets having sufficiently long fiber length in a high rate of the glass fiber in granulation of the pellets using a biaxial extruder. Moreover, when polyamide 6, polyamide 66 or the like is used, elastic modulus lowers due to water absorption. Accordingly, it is important to use a polyamide having high melt point which exhibits small degree of lowering of elastic modulus due to water absorption.

With regard to the glass fibers (B), those in various cross-sectional shape may be applied. It is preferred that glass fibers used for a purpose of increasing expression of elastic modulus to specific gravity include those which has a flat cross-sectional shape in such views that the glass fibers are hardly bent upon pellet production, that expression of physical properties is large due to a large glass fiber surface area and that warping and deformation of a molded product can be suppressed. Further, when two or more kinds of glass fibers having a flat cross section in different (long diameter)/(short diameter) ratios are used upon kneading with the polyamide resin (A), it is possible to disarrange the resin-flowing pattern and to suppress a quick resin flow from a specific orifice of an extruder. As a result thereof, productivity in a production method wherein pellets are granulated by biaxial extrusion and also by strand cutting becomes significantly good and it is possible to efficiently prepare pellets in such a composition ratio which expresses high bending elastic modulus to specific gravity.

In preparing a polyamide resin composition according to the present invention, it is preferred that a polyamide-reactive silane coupling agent is added in an amount of 0.1 to 1.0% by weight of glass fibers (B) to a mixture consisting of polyamide resin (A) and glass fibers (B), particularly when glass fibers having a flat cross section are used. As to a converging agent for chop strand for the polyamide, a small amount of a silane coupling agent is previously contained in a fiber bundle in order to improve adhesive property to a matrix resin. However, since there is an upper limit for the amount of the amino silane coupling agent which can be previously adhered to the fiber bundle so as to avoid poor opening of the fiber bundle during the extrusion, the shortfall is preferred to be further added separately.

With regard to the polyamide resin composition according to the present invention, its heat resistance can be improved when it contains a copper compound (C) in an amount of at most 0.5% by weight, preferably in an amount of at least 0.01% by weight and at most 0.4% by weight. When the copper compound (C) is less than 0.01% by weight, retention rate of the bending strength at 180° C. for 2000 hours is still in low values and there is a possibility that resistance to aging upon heating cannot be improved. On the other hand, even when more than 0.5% by weight is added, the resistance to aging upon heating is not improved further but there is a possibility that physical properties lower. Specific examples of the copper compound are copper chloride, copper bromide, copper iodide, copper acetate, copper acetylacetonate, copper carbonate, copper borofluoride, copper citrate, copper hydroxide, copper nitrate, copper sulfate and copper oxalate. It is also possible in the present invention to add a stabilizer as other additive component (D) such as an alkali halide compound in a manner of joint use with the copper compound. Examples of such an alkali halide compound are lithium bromide, lithium iodide, potassium bromide, potassium iodide, sodium bromide and sodium iodide and a particularly preferred one is potassium iodide.

Moreover, in the polyamide resin composition according to the present invention, a mixture of polyamide resin (A), glass fibers (B), and copper compound (C) may be compounded with other additive component (D) in an amount of at most 5% by weight such as the above stabilizer, inorganic filler, carbon black as a weather resistance improver, phenol-type antioxidant and phosphorus-type antioxidant as a stabilizer to light or heat, mold-releasing agent, crystal nucleus agent, lubricant, flame retardant, antistatic agent, pigment, dye, etc. within such an extent that it does not deteriorate the characteristic feature of the present invention.

There is no particular limitation for the method of producing the polyamide resin composition of the present invention and each of the components may be melted and kneaded by the conventionally known kneading method to give the composition. There is also no limitation for a specific kneading apparatus. Uniaxial or biaxial extruder, kneading machine, kneader, etc. may be exemplified. Among them, biaxial extruder is particularly preferred in view of productivity. Although there is also no particular limitation for a screw arrangement, it is preferred to provide a kneading zone so that each of the components is more uniformly dispersed. As to a specific method therefor, there is exemplified a method wherein polyamide resin (A) is preblended together with copper compound (C) and other additive component (D) using a blender and poured into a uniaxial or biaxial extruder from a hopper, then glass fibers (B) are poured into a melted mixture in the uniaxial or biaxial kneader using a feeder under a state wherein at least a part of (A) is melted and, after the melting and kneading thereof, it is blown out into a strand form followed by cooling and cutting.

In the polyamide resin composition according to the present invention prepared as mentioned above, specific gravity $\rho$ (g/cm$^3$) and bending elastic modulus E (GPa) of the molded product can satisfy formulae: $11<E/\rho<18$ and $1.7<\rho<2.0$ when the specific polyamide resin (A) and the glass fibers (B) having a specific cross-sectional area are used whereupon excellent heat resistance, good anti-vibration property and very high bending strength and impact resistance can be achieved.

In the polyamide resin composition according to the present invention, weight-average length of the residual glass fibers in the molded product is preferred to be 300 to 1000 μm. Measurement of the residual glass fiber length is conducted as follows. Thus, in a material wherein the glass fibers are highly filled, there is much interference among the glass fibers each other whereby the glass fibers are apt to be broken upon the measurement and correct fiber length is hardly determined. Therefore, in order to correctly measure the glass fiber length in the present invention, pellets prepared by melting and kneading are strongly heated at 650° C. for 2 hours so that the glass fibers are taken out as ash without breaking the glass fibers and the resulting glass fibers are immersed in water and dispersed therein using a commonly used ultrasonic washing machine. The dispersed glass fibers are then taken out onto a preparation for observation under a microscope and observed under a digital microscope (KH-7700 manufactured by Hirox Co., Ltd.) with 80 magnifications and the fiber length in terms of weight-average is determined and adopted as the residual glass fiber length. Incidentally, there is no particular limitation for the shape of pellets so far as it is a generally resulting shape. Thus, its cross section is any of, for example, circular, elliptic and long circular ones and its diameter (both in terms of short and long ones) is 2.0 to 4.0 mm while the pellet length is about 2.5 to 6.0 mm. With regard to the condition for making into pellets, there is no particular limitation provided that it is a general condition. For example, a method mentioned in Examples which will be mentioned later will be exemplified.

Resonance frequency F(0) mentioned in the present invention is in a relation of $F(0) \propto k(E/\rho)^{(1/2)}$, wherein E means elastic modulus (MPa) and $\rho$ means specific gravity (g/cm$^3$). Thus resonance frequency F(0) is in a proportional relation to a root of X value given as $X=E/\rho$. Thus, in a composition constitution having rather high bending elastic modulus for its specific gravity, the resonance frequency in the molded product thereof becomes higher whereby anti-vibration property can be said to be improved. In the constitution of conventional polyamide resin composition reinforced with glass fiber wherein mainly injection molding is a prerequisite, glass fiber diameter of 6.5 to 13 μm has been said to be optimum for making strength and impact expression higher in relation to the adding amount of glass fibers. Thus, with regard to the cross-sectional area, the glass fiber diameter of $3.3 \times 10^{-7}$ cm$^2$ to $1.34 \times 10^{-6}$ cm$^2$ has been designed to be optimum. Due to its small diameter, upper limit of the filling amount of the glass fibers of such a cross-sectional area into a polyamide resin composition has been about 65% by weight and, with regard to X value wherein resonance frequency is proportional to its root as shown by the present invention, it has been within a range of $X<11$. Within such a range, sufficiently high resonance frequency cannot be achieved. The present invention uses thicker glass fibers in order to prepare pellets of polyamide resin composition which are used for injection molding and which can express higher resonance frequency. In addition, for suppressing the lowering of resonance frequency due to water absorption, a polyamide resin having high melt point and showing little lowering of elastic modulus due to water absorption is used as a polyamide in the present invention.

As a result, a molded product of the resin composition according to the present invention can exhibit good antivibration property and, even upon water absorption, it can exhibit no lowering of resonance frequency.

Moreover, in the polyamide resin composition of the present invention, a polyamide having a different composition from the polyamide resin (A) may be subjected to a polymer blending. There is no particular limitation for the polyamide having a different composition from the polyamide resin (A) of the present invention. For example, in order to enhance the molding property by enhancing the crystallization speed, polyamide 66, polyamide 6T66 or the like may be blended and, in order to give lower water absorption property, polyamide 10T derivative or the like may be blended. As to the adding amount of the polyamide having different composition from the polyamide resin (A), the optimum amount may be selected and it is possible to add at most 50 parts by mass thereof to 100 parts by mass of the polyamide resin (A).

Further, a thermoplastic resin which is other than the polyamide having different composition from the polyamide resin (A) may be added to the polyamide resin composition of the present invention. Examples of the thermoplastic resin as such are polyphenylene sulfide (PPS), liquid crystal polymer (LCP), aramid resin, polyether ether ketone (PEEK), polyether ketone (PEK), polyether imide (PEI), thermoplastic polyimide, polyamide imide (PAI), polyether ketone ketone (PEKK), polyphenylene ether (PPE), polyether sulfone (PES), polysulfone (PSU), polyarylate (PAR), polyethylene terephthalate, polybutylene terephthalate, polyethylene naphthalate, polybutylene naphthalate, polycarbonate (PC), polyoxymethylene (POM), polypropylene (PP), polyethylene (PE), polymethylpentene (TPX), polystyrene (PS), methyl polymethacrylate, acrylonitrile-styrene copolymer (AS) and acrylonitrile-butadiene-styrene copolymer (ABS). Although the thermoplastic resin as such may be blended in a melted state by means of melt kneading, it is also possible that the thermoplastic resin is made into fiber or particles and then dispersed into the polyamide resin composition of the present invention. As to the adding amount of the thermoplastic resin, the optimum amount may be selected and it is possible to add at most 50 parts by mass thereof to 100 parts by mass of the polyamide resin (A) having high melt point.

EXAMPLES

Effect of the present invention will now be illustrated in detail as hereunder by Examples although the present invention is not limited to the following Examples so far as it does not exceed the gist thereof. Measurement of the physical data in the Examples was carried out in accordance with the following methods.

<Relative Viscosity>

Polyamide resin (0.25 g) was dissolved in 25 ml of 96% sulfuric acid and relative viscosity thereof was measured at 20° C. using an Ostwald viscometer.

<Amount of Terminal Amino Group>

Polyamide resin (0.2 g) was dissolved in 20 ml of m-cresol and titrated using a 0.1 mol/liter ethanolic solution of hydrochloric acid. As to an indicator, Cresol Red was used. The amount of terminal amino acid was expressed in terms of equivalent(s) in 1 ton of the resin (eq/ton).

<Melt Point (Tm) and Crystallization Temperature Upon Temperature Rise (Tc1)>

A test piece for UL combustion test of 127 mm length, 12.6 mm width and 0.8 mmt thickness was prepared by injection molding using an injection molding machine EC-100 manufactured by Toshiba Machine wherein cylinder temperature was set at the melt point of the resin +20° C. and metal mold temperature was set at 35° C. In order to measure the melt point (Tm) and crystallization temperature upon temperature rise (Tc1) of the resulting molded product, a part of the molded product was weighed (5 mg) and placed in a pan made of aluminum and made into a tightly sealed state using a cover made of aluminum to prepare a sample for the measurement. After that, it was subjected to a measurement using a differential scanning colorimeter (SSC/5200 manufactured by Seiko Instruments) in a nitrogen atmosphere by raising the temperature from room temperature up to 350° C. at the rate of 20° C./minute. Among the resulting exothermic peaks obtained at that time, the peak top temperature of the peak of the highest temperature was adopted as the crystallization temperature upon temperature rise (Tc1). Temperature was further raised and the peak top temperature of endothermic change due to melting was adopted as the melt point (Tm).

<Heat Resistance Against Soldering>

A test piece for UL combustion test of 127 mm length, 12.6 mm width and 0.8 mmt thickness was prepared by injection molding using an injection molding machine EC-100 manufactured by Toshiba Machine wherein cylinder temperature was set at the melt point of the resin +20° C. and metal mold temperature was set at 140° C. The test piece was allowed to stand in an atmosphere of 85° C. and 85% RH (relative humidity) for 72 hours. The test piece was subjected to a preliminary heating in an Air Reflow furnace (AIS-20-82C manufactured by Eightech) by raising its temperature from room temperature to 150° C. during 60 seconds and then preheated up to 190° C. at the temperature raising rate of 0.5° C./minute. After that, temperature was raised up to the predetermined set temperature at the rate of 100° C./minute, kept at the predetermined temperature for 10 seconds and then cooled. The set temperature was raised every 5° C. starting from 240° C. The highest set temperature wherein neither swelling nor deformation was noted on the surface of the test piece was adopted as the reflow heat resistance temperature. The heat resistance against soldering was expressed according to the following standard.

○: reflow heat resistance temperature was 260° C. or higher

×: reflow heat resistance temperature was lower than 260° C.

<Residual Glass Fiber Length>

The residual glass fiber length in the molded product was measured by the following methods.

Thus, in a material wherein the glass fibers are highly filled, there is much interference among the glass fibers each other whereby the glass fibers are apt to be broken upon the measurement and correct fiber length is hardly determined. Therefore, in order to correctly measure the glass fiber length in the present invention, pellets prepared by melting and kneading were strongly heated at 650° C. for 2 hours so that the glass fibers are taken out as ash without breaking the glass fibers and the resulting glass fibers were immersed in water. The dispersed glass fibers were then taken out onto a preparation for observation under a microscope and observed under a digital microscope (KH-7700 manufactured by Hirox Co., Ltd.) with 80 magnifications and the fiber length in terms of weight-average was determined and adopted as the residual glass fiber length.

<Specific Gravity>

Specific gravity was measured in accordance with JIS-Z8807.

<Resonance Frequency>

A vibration test was conducted by a central exciting method using an ISO tensile dumbbell test piece by referring to ISO 6721-1 (cf. FIG. 1). Central area of the test piece was fixed to an exciter, vibration was applied thereto from the exciter in an atmosphere of 23° C. and 50% RH and the acceleration response was subjected to Fourier conversion according to ISO 6721-1 to calculate a frequency-responding function whereby resonance frequency was determined.

<Lowering of Resonance Frequency Due to Water Absorption>

After the test piece was subjected to the treatment under the high-temperature and high-humidity atmosphere of 80° C. and 95% for one week, bending elastic modulus and resonance frequency thereof were measured according to the above measuring method. The case wherein the bending elastic modulus retaining rate lowered to an extent of 60% or more and the primary resonance point lowered to an extent of 10 Hz or more as compared with the state before the water absorption treatment was marked "×". On the contrary, the case wherein retention of the bending elastic modulus was 80% or more and lowering of the resonance frequency was less than 5 Hz was marked "○".

<Bending Strength and Bending Elastic Modulus>

An injection molding machine EC-100 manufactured by Toshiba Machine was used wherein the cylinder temperature was set at the melt point of the resin +20° C. and the metal mold temperature was set at 140° C. and a test piece for the evaluation was prepared in accordance with JIS K 7161 whereupon evaluation of the properties was conducted.

In each of Examples and Comparative Examples, the following materials were used.

<Copolymerized Polyamide Resin (A1)>

1,6-Hexamethylenediamine (7.54 kg), 10.79 kg of terephthalic acid, 7.04 kg of 11-aminoundecanoic acid, 9 g of sodium diphosphite as a catalyst, 40 g of acetic acid as a terminal adjusting agent and 17.52 kg of deionized water were charged in a 50-liter autoclave. Pressurization was conducted using nitrogen from atmospheric pressure to 0.05 MPa and the pressure was released to return to atmospheric pressure. This operation was conducted for three times. After substitution with nitrogen was conducted, content of the autoclave was uniformly dissolved with stirring at 135° C. and 0.3 MPa. After that, the dissolved solution was continuously provided using a liquid-sending pump, heated up to 240° C. by means of a heating tube and heated for one hour. After that, the reaction mixture was provided to a pressurizing reaction container and heated at 290° C. and a part of water was distilled out so that the inner pressure of the container was maintained at 3 MPa to give a low-order condensed product. After that, this low-order condensed product was directly provided to a biaxial extruder (screw diameter: 37 mm; L/D=60) while maintaining the melted state, and polycondensation was conducted under the melted state at the resin temperature of 335° C. while discharging the water from vents at three places whereupon a copolymerized polyamide resin (A1) was prepared. In the resulting copolymerized polyamide resin (A1), relative viscosity was 2.1, amount of terminal amino group was 16 eq/ton and melt point was 314° C. The charging ratios of the material monomers for the copolymerized polyamide resin (A1) are shown in Table 1.

<Copolymerized Polyamide Resin (A2)>

The same operation as that for producing the copolymerized polyamide resin (A1) was conducted except that the amount of 1,6-hexamethylenediamine was changed to 8.12 kg, the amount of terephthalic acid was changed to 11.62 kg and the amount of 11-aminoundecanoic acid was changed to 6.03 kg whereupon a copolymerized polyamide resin (A2) was synthesized. In the resulting copolymerized polyamide resin (A2), relative viscosity was 2.1, amount of terminal amino group was 28 eq/ton and melt point was 328° C. The charging ratios of the material monomers for the copolymerized polyamide resin (A2) are shown in Table 1.

<Copolymerized Polyamide Resin (A3)>

The same operation as that for producing the copolymerized polyamide resin (A1) was conducted except that the amount of 1,6-hexamethylenediamine was changed to 8.12 kg, the amount of terephthalic acid was changed to 9.96 kg, the amount of 11-aminoundecanoic acid was changed to 6.03 kg, and 1.46 kg of adipic acid (dicarboxylic acid other than terephthalic acid) is charged whereupon a copolymerized polyamide resin (A3) was synthesized. In the resulting copolymerized polyamide resin (A3), relative viscosity was 2.1, amount of terminal amino group was 35 eq/ton and melt point was 310° C. The charging ratios of the material monomers for the copolymerized polyamide resin (A3) are shown in Table 1.

<Copolymerized Polyamide Resin (A4)>

The same operation as that for producing the copolymerized polyamide resin (A1) was conducted except that 7.04 kg of 11-aminoundecanoic acid was changed to 6.41 kg of undecane lactam whereupon a copolymerized polyamide resin (A4) was synthesized. In the resulting copolymerized polyamide resin (A4), relative viscosity was 2.1, amount of terminal amino group was 13 eq/ton and melt point was 315° C. The charging ratios of the material monomers for the copolymerized polyamide resin (A4) are shown in Table 1.

<Copolymerized Polyamide Resin (A5)>

The same operation as that for producing the copolymerized polyamide resin (A1) was conducted except that the amount of 1,6-hexamethylenediamine was changed to 5.22 kg, the amount of terephthalic acid was changed to 7.47 kg and the amount of 11-aminoundecanoic acid was changed to 11.06 kg whereupon a copolymerized polyamide resin (A5) was synthesized. In the resulting copolymerized polyamide resin (A5), relative viscosity was 2.0, amount of terminal amino group was 15 eq/ton and melt point was 273° C. The charging ratios of the material monomers for the copolymerized polyamide resin (A5) are shown in Table 1.

TABLE 1

| | | Copolymerized polyamide resin | | | | |
|---|---|---|---|---|---|---|
| | | A1 | A2 | A3 | A4 | A5 |
| Constituent monomer (mol %) | terephthalic acid | 65 | 70 | 60 | 65 | 45 |
| | adipic acid | | | 10 | | |
| | 1,6-hexamethylenediamine | 65 | 70 | 70 | 65 | 45 |
| | 11-aminoundecanoic acid | 35 | 30 | 30 | | 55 |
| | undecanelactam | | | | 35 | |
| Melt point Tm (° C.) | | 314 | 328 | 310 | 315 | 273 |
| Crystallization temperature upon temperature rise Tc1 (° C.) | | 134 | 137 | 132 | 135 | 132 |

<Other Polyamide Resins>

Polyamide 6T6I: polyamide 6I6I having relative viscosity (RV) of 2.0: "Grivory G21" manufactured by EMS, CEG=87, non-crystalline polyamide; since it is a non-crystalline polyamide, Tc1 cannot be measured by the above-mentioned DSC measurement.

Polyamide MXD6: polyamide MXD6 having relative viscosity (Rv) of 2.1: "Nylon T 600" manufactured by Toyobo, CEG=65, crystalline polyamide; Tc1 measured by the above-mentioned DSC measurement is 135° C.

Polyamide 66: polyamide 66 having relative viscosity (RV) of 2.4: "Stabamid 23AE" manufactured by Rhodia, CEG=91, crystalline polyamide; since it crystallizes even when the metal mold temperature is 35° C., Tc1 cannot be measured by the above-mentioned DSC measurement.

<Glass Fibers (B)>

(b1) "CSG3PA810S" manufactured by Nittobo as a chop strand of glass fiber having a flat cross section; flatness degree: 4 (ratio of short diameter to long diameter=0.25); short diameter: 7 μm; fiber length: 3 mm; cross-sectional area=1.67×10$^{-6}$ cm$^2$ to 1.96×10$^{-6}$ cm$^2$ (b2) "CSG3PL810S" manufactured by Nittobo as a chop strand of glass fiber having a flat cross section; flatness degree: 2.5 (ratio of short diameter to long diameter=0.4); short diameter: 9 μm; fiber length: 3 mm; cross-sectional area=1.72×10$^{-6}$ cm$^2$ to 2.03×10$^{-6}$ cm$^2$ (b3) "T-275N" manufactured by Nippon Electric Glass Co., Ltd. as a chop strand of glass fiber having a circular cross section; diameter: 17 μm; fiber length: 3 mm; cross-sectional area=about 2.27×10$^{-6}$ cm$^2$ (b4) "T-275H" manufactured by Nippon Electric Glass Co., Ltd. as a chop strand of glass fiber having a circular cross section; diameter: 11 μm; fiber length: 3 mm; cross-sectional area=about 9.50×10$^{-7}$ cm$^2$ <Copper Compound (C)>
Copper bromide (II)
<Other Additive Components (D)>
Mold-releasing agent: Montanate wax "WE 40" manufactured by Clariant
Stabilizer: potassium iodide
Coupling agent: "KBE 903" manufactured by Shin-Etsu Chemical Co., Ltd. as an aminosilane coupling agent Black pigment: "ABF-T-9801" manufactured by Resino Color as master batch of carbon black, master base=AS resin, containing 45% by weight of carbon black, furnace black Examples 1 to 5 and Comparative Examples 1 to 5

Components other than the glass fibers (B) were subjected to dry blending under the compounding ratios as shown in Table 1 and subjected to the melt mixing under the extruding condition wherein the cylinder temperature was set at the melt point of the base resin +15° C. and the screw revolution was 250 rpm using a biaxial extruder "STS 35 mm" (constituted from 12 blocks of barrel) which was a biaxial extruder of a bent type manufactured by Coperion and, after that, the glass fibers (B) were fed by a side feeding system to conduct a melt kneading. Strand extruded from the extruder was quickly cooled and made into pellets using a strand cutter. Incidentally, there is no particular limitation for the shape of pellets so far as it is a generally resulting shape. Thus, its cross section is any of, for example, circular, elliptic and long circular ones and its diameter (both in terms of short and long ones) is 2.0 to 4.0 mm while the pellet length is about 2.5 to 6.0 mm. With regard to the condition for making into pellets, there is no particular limitation provided that it is a general condition. The resulting pellets were dried at 100° C. for 12 hours, then molded into test pieces for various tests using an injection molding machine (IS 80 manufactured by Toshiba Machine Co., Ltd.) wherein the cylinder temperature was at the melt point of the base resin +15° C. and the metal mold temperature was 130° C. The resulting test pieces were subjected to the evaluation. Result of the evaluation is also mentioned in Table 2. The result of measurement of resonance frequency of Example 1 is shown in FIG. 2(a), and a graph of resonance frequency with elapse of time of Example 1 and Comparative Example 1 after the treatment at 80° C.×95% is shown in FIG. 2(b).

TABLE 2

| | | | Example 1 | Example 2 | Example 3 | Example 4 | Example 5 |
|---|---|---|---|---|---|---|---|
| (A) | Copolymerized polyamide resin (A1) | parts by weight | 30 | 30 | | | |
| | Copolymerized polyamide resin (A2) | parts by weight | | | 30 | | |
| | Copolymerized polyamide resin (A3) | parts by weight | | | | 30 | |
| | Copolymerized polyamide resin (A4) | parts by weight | | | | | 35 |
| | Copolymerized polyamide resin (A5) | parts by weight | | | | | |
| | Polyamide 6T6I | parts by weight | | | | | |
| | Polyamide MXD | parts by weight | | | | | |
| | Polyamide 66 | parts by weight | | | | | |
| (B) | Glass fiber having a flat cross section (flatness degree: 4.0) (cross-sectional area = 1.67 × 10$^{-6}$ to 1.96 × 10$^{-6}$ cm$^2$) (b1) | parts by weight | 10 | | | | |
| | Glass fiber having a flat cross section (flatness degree: 2.5) (cross-sectional area = 1.72 × 10$^{-6}$ to 2.03 × 10$^{-6}$ cm$^2$) (b2) | parts by weight | 70 | 50 | 70 | 70 | 65 |
| | Glass fiber having a circular cross section (cross-sectional area = about 2.27 × 10$^{-6}$ cm$^2$) (b3) | parts by weight | | 10 | | | |
| | Glass fiber having a circular cross section (cross-sectional area = about 9.50 × 10$^{-7}$ cm$^2$) (b4) | parts by weight | | | | | |
| (C) | Copper bromide | parts by weight | 0.02 | 0.02 | 0.02 | 0.02 | 0.02 |
| (D) | Mold-releasing agent | parts by weight | 0.3 | 0.3 | 0.3 | 0.3 | 0.3 |
| | Black pigment | parts by weight | 0.6 | 0.6 | 0.6 | 0.6 | 0.6 |
| | Stabilizer | parts by weight | 0.1 | 0.1 | 0.1 | 0.1 | 0.1 |
| | Coupling agent | parts by weight | 0.2 | 0.2 | 0.2 | 0.2 | 0.2 |
| Properties of molded product | Specific gravity (ρ) | g/cm$^3$ | 1.85 | 1.85 | 1.85 | 1.85 | 1.80 |
| | Bending elastic modulus (E) | Gpa | 25.0 | 24.8 | 24.6 | 24.9 | 22.0 |
| | X = E/ρ | — | 13.5 | 13.4 | 13.3 | 13.5 | 12.2 |
| | Resonance frequency | Hz | 255 | 254 | 255 | 254 | 240 |
| | Bending strength | MPa | 400 | 389 | 399 | 395 | 389 |
| | Lowering of resonance frequency due to water absorption | kJ/m$^2$ | ○ | ○ | ○ | ○ | ○ |
| | Heat resistance against soldering | | ○ | ○ | ○ | ○ | ○ |
| | Residual glass fiber length | μm | 410 | 388 | 398 | 420 | 470 |

TABLE 2-continued

| | | | Comparative Example 1 | Comparative Example 2 | Comparative Example 3 | Comparative Example 4 | Comparative Example 5 |
|---|---|---|---|---|---|---|---|
| (A) | Copolymerized polyamide resin (A1) | parts by weight | | | | | |
| | Copolymerized polyamide resin (A2) | parts by weight | | | | | |
| | Copolymerized polyamide resin (A3) | parts by weight | | | | | |
| | Copolymerized polyamide resin (A4) | parts by weight | | | | 30 | |
| | Copolymerized polyamide resin (A5) | parts by weight | | | 30 | | |
| | Polyamide 6T6I | parts by weight | | 10 | | | |
| | Polyamide MXD | parts by weight | 23 | | | | 15 |
| | Polyamide 66 | parts by weight | 7 | 20 | | | 15 |
| (B) | Glass fiber having a flat cross section (flatness degree: 4.0) (cross-sectional area = 1.67 × 10$^{-6}$ to 1.96 × 10$^{-6}$ cm$^2$) (b1) | parts by weight | | | | | 10 |
| | Glass fiber having a flat cross section (flatness degree: 2.5) (cross-sectional area = 1.72 × 10$^{-6}$ to 2.03 × 10$^{-6}$ cm$^2$) (b2) | parts by weight | 70 | 70 | 70 | | 50 |
| | Glass fiber having a circular cross section (cross-sectional area = about 2.27 × 10$^{-6}$ cm$^2$) (b3) | parts by weight | | | | | 10 |
| | Glass fiber having a circular cross section (cross-sectional area = about 9.50 × 10$^{-7}$ cm$^2$) (b4) | parts by weight | | | | 70 | |
| (C) | Copper bromide | parts by weight | 0.02 | 0.02 | 0.02 | 0.02 | 0.02 |
| (D) | Mold-releasing agent | parts by weight | 0.3 | 0.3 | 0.3 | 0.3 | 0.3 |
| | Black pigment | parts by weight | 0.6 | 0.6 | 0.6 | 0.6 | 0.6 |
| | Stabilizer | parts by weight | 0.1 | 0.1 | 0.1 | 0.1 | 0.1 |
| | Coupling agent | parts by weight | 0.2 | 0.2 | 0.2 | 0.2 | 0.2 |
| Properties of molded product | Specific gravity (ρ) | g/cm$^3$ | 1.85 | 1.85 | 1.85 | production was impossible | 1.84 |
| | Bending elastic modulus (E) | Gpa | 26.5 | 23.5 | | | 26.0 |
| | X = E/ρ | — | 14.3 | 12.7 | 0.0 | | 14.1 |
| | Resonance frequency | Hz | 253 | 237 | 254 | | 252 |
| | Bending strength | MPa | 380 | 280 | 500 | | 360 |
| | Lowering of resonance frequency due to water absorption | kJ/m$^2$ | x | x | o | | x |
| | Heat resistance against soldering | | x | x | x | | x |
| | Residual glass fiber length | μm | 411 | 420 | 412 | | 320 |

In the table, parts by weight of black pigment are expressed in terms of carbon black pure component.

As will be apparent from Table 2, the test pieces of Examples 1 to 5 are molded products which have very high resonance frequencies and exhibit no lowering of resonance frequency due to water absorption, are excellent in both of bending strength and bending elastic modulus and have useful characteristic values as anti-vibration molded products. Since a polyamide resin having high melt point is used, the products also have sufficient heat resistance against soldering. Further, bending elastic modulus values to specific weight (X=E/ρ) are high. On the contrary, in the test pieces of Comparative Examples 1 to 5, when no specific copolymerized polyamide is used, lowering of elastic modulus and resonance frequency are significant and the test pieces are inferior as compared with those of Examples 1 to 5. Moreover, even when a specific copolymerized polyamide is used, no high filling is possible in case glass fibers of small cross-sectional area are used whereby no sufficiently high X=E/ρ can be adjusted. Accordingly, the resulting resin composition has low resonance frequency in terms of its initial value and the test piece is inferior to that of Examples.

INDUSTRIAL APPLICABILITY

The molded product according to the polyamide resin composition of the present invention has a high anti-vibration property due to its very high resonance frequency, does not exhibit lowering of resonance frequency due to water absorption and also expresses high characteristics in bending strength, bending elastic modulus and anti-impact value. Moreover, it also has a heat resistance against soldering. Accordingly, it is suitable for the cases of electric/electronic instruments such as mobile phones and personal computers and also for automobile parts and is most suitable particularly as parts for vehicles.

The invention claimed is:

1. A polyamide resin composition, comprising a polyamide resin (A) having melt point (Tm) of 290° C. to 350° C. and having crystallization temperature upon temperature rise (Tc1) of 80 to 150° C., and glass fibers (B) having cross-sectional area of 1.5 to 5.0 ×10$^{-6}$ cm$^2$, characterized in that, ratio by weight of the polyamide resin (A) to the glass fibers (B) [(A):(B)] is from 20:80 to 35:65, and that the polyamide resin (A) is a copolymerized polyamide consisting of 55 to 75 molar % of a constituent unit (a) obtained from an equimolar salt of hexamethylenediamine and terephthalic acid, and 45 to 25 molar % of a constituent unit (b) obtained from 11-aminoundecanoic acid or undecane lactam.

2. The polyamide resin composition according to claim 1, wherein the polyamide resin (A) contains at most 20 molar % of a constituent unit (c) obtained from an equimolar salt of diamine and dicarboxylic acid which is other than the above constituent unit (a) or a constituent unit (c) obtained from aminocarboxylic acid or lactam which is other than the above constituent unit (b).

3. The polyamide resin composition according to claim 1, wherein a part of or all of the glass fibers (B) is/are glass fibers having a flat cross section, wherein the glass fibers having a flat cross section consist of glass fibers (B-1) having a flat cross section and having ratio of short diameter to long diameter of from 0.3 to 0.5 and glass fibers (B-2) having a flat cross section and having ratio of short diameter to long diameter of from 0.2 to 0.3, and wherein ratio by weight thereof [(B-1) : (B-2)] is from 0:100 to 100:0.

4. The polyamide resin composition according to claim 1, wherein the composition further comprises a copper compound (C) in an amount of at most 0.5% by weight.

5. The polyamide resin composition according to claim 1, wherein the composition further comprises an additive component (D) containing mold-releasing agent, stabilizer, carbon black, and/or coupling agent in an amount of at most 5% by weight.

6. A molded product formed of the polyamide resin composition according to claim 1, wherein specific gravity $\rho$(g/cm$^3$) of the molded product and bending elastic modulus E (GPa) of the molded product satisfy formulae: $11<E/\rho<18$ and $1.7<\rho<2.0$.

7. The molded product according to claim 6, wherein weight-average length of the residual glass fibers in the molded product is 300 to 1000 μm.

8. The molded product according to claim 6, wherein the molded product is used for electric/electronic cases or for interior equipment or exterior equipment of vehicles.

9. The molded product according to claim 8, wherein the molded product is used for parts for holding a mirror for vehicles.

* * * * *